Patented July 1, 1930

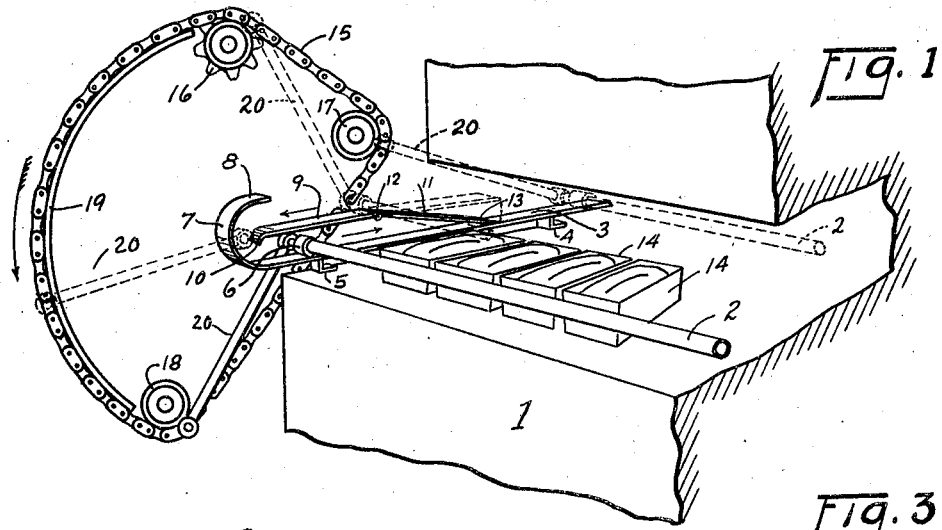

1,769,201

UNITED STATES PATENT OFFICE

ARTHUR W. BRANDEEN AND LESLIE H. DION, OF GRAND RAPIDS, MICHIGAN

BAKE-OVEN-FEEDING APPARATUS

Application filed September 1, 1928. Serial No. 303,420.

This invention relates to a power driven apparatus for sliding pans of bread dough into a bake oven.

The main objects of this invention are to provide an improved apparatus by the use of which a number of bread pans containing dough are simultaneously moved into an oven; to provide an apparatus which will permit the operation of a large oven by one man where two have heretofore been required, and to provide such an apparatus which is simple in construction and efficient in operation.

An illustrative embodiment of this invention is shown in the accompanying drawings in which:

Fig. 1 is a fragmentary view partly in perspective and partly in elevation of one end of a bake oven equipped with our improved apparatus.

Fig. 2 is a plan view of the same.

Fig. 3 is a diagrammatic view showing the different positions of the feeding bar relative to the upper and lower trackways.

Fig. 4 is a fragmentary view showing the different positions of the feeding bar with relation to the bread pans.

In the construction shown in the drawings a bake oven 1 is shown equipped with our improved feeding apparatus which comprises a feed bar 2 adapted to extend across the front of the oven 1. The bar 2 is supported at each end in identically the same manner and operated by the same kind of mechanism so that a description of the mechanism shown at one end thereof as illustrated in Fig. 1 will suffice for both.

A lower trackway 3 is mounted on upstanding supports 4 and 5 on the oven 1 for supporting the adjacent end of the feed bar 2, said bar being provided with a roller 6 for bearing on the trackway. The front end of the trackway 3 is curved upwardly as shown at 7 and then rearwardly as shown at 8 in spaced relation to the remainder of the trackway.

An upper return trackway 9 is provided in spaced relation above the trackway 3 and in spaced relation below the rearwardly turned end 8. The front end 10 of the return trackway 9 is curved slightly downwardly and terminates in spaced relation to the curved portion 7 of the lower trackway. The main portion of the trackway 9 is substantially parallel to the lower trackway 3 but the rear portion 11 thereof is hingedly connected thereto as shown at 12 and the free end 13 normally rests by gravity on the lower trackway 3.

An identical set of trackways is provided at the opposite side of the oven for supporting the opposite end of the feed bar 2 and these trackways are so positioned with respect to the floor of the oven 1 that when the bar 2 is on the lower trackway, it will abut against the ends of a plurality of bread pans 14 and when on the upper or return trackway 9 said bar will be in spaced relation above said bread pans as shown most clearly in Fig. 4 of the drawings.

Adjacent each side of the oven a sprocket chain 15 is journalled on a sprocket drive gear 16, idler wheels 17 and 18, and a curved guideway 19. A link 20 is pivotally connected at one end to the sprocket chain 15 and is connected at its other end to the adjacent end of the feed bar 2. The drive sprocket 16 is keyed to a shaft 21 journalled in a bearing box 22 mounted on supporting frame 23 and the opposite end of shaft 21 carries a sprocket gear 24 driven by a sprocket chain 25 from any suitable source of power (not shown). A guard 26 is supported by a bracket 27 mounted on frame 23 for protecting the sprocket chain 15 at the point where it passes around the curved guideway 19.

The positions of the sprocket 16, idlers 17 and 18 and guideway 19 are such that when the chain 15 is driven in a direction shown by the arrow in Fig. 1, the feed bar 2 will go through a certain predetermined cycle of motion. Assuming the bar to be in a position shown in full lines in Fig. 1 the travel of the sprocket chain 15 will cause the bar to slide rearwardly on the lower trackway 3 to a point beyond the free end 13 of the hinged upper track portion 11 as shown in dotted outline in said Fig. 1. As the feed bar travels rearwardly during this period, it contacts with the under side of the hinged track portion 11 and raises it to the position shown in dotted outline in Figs. 1 and 3. After the bar has passed beyond the free end 13 the hinged portion will drop by gravity back on to the lower trackway 3.

Continued motion of the sprocket chain 15 then causes the feed bar 2 to move forwardly on the rear end of the trackway 3 upwardly the inclined hinged portions 11 and then horizontally forwardly on the return track 9 until the bar drops by gravity from the front end 10 of said trackway on to the lower trackway 3 whereupon the cycle of motion is repeated.

In the use of this feeding device, the bread pans 14 are set along side by side as shown in the drawings and rearward movement of the feed bar 2 will move the bread pans back into the oven 1. As soon as the pans have been moved rearwardly a distance equal to the length of the pans, additional bread pans are placed by the operator at the front end of the oven 1 in the same manner as before. In the return movement of the feed bar 2 it will travel forwardly in spaced relation above the bread pans as shown most clearly in Fig. 4 of the drawings until the front end of the track 9 is reached at which time it will drop to the lower trackway to engage the second and succeeding rows of bread pans.

Although but one specific embodiment of this invention has been herein shown and described, it will be understood that numerous details of the construction shown may be altered or omitted without departing from the spirit of this invention as defined by the following claims.

We claim:

1. A device of the class described comprising a feeding bar adapted to extend across the front of an oven, a lower trackway for supporting each end of said bar at a height to engage bread pans, a return trackway in spaced relation above each of said lower trackways, the rear portions of said return trackways being hinged and the free ends thereof normally resting by gravity on said lower trackways and means for imparting horizontal reciprocating motion to said feeding bar to move said bar through a predetermined cycle of motion constituting the movement of said feed bar rearwardly on said lower trackways to a point beyond the free ends of said hinged portions, then forwardly up said hinged portions and past the front ends of said return trackways, so as to cause said bar to drop by gravity to said lower trackways in order to repeat the aforesaid cycle of movements.

2. A device of the class described comprising a feeding bar adapted to extend across the front of an oven, a lower trackway for supporting each end of said bar at a height to engage bread pans, the front ends of said lower trackways being curved upwardly and then rearwardly in spaced relation thereto, a return trackway in spaced relation above each of said lower trackways and in spaced relation below the rearwardly turned ends thereof, the front ends of said return trackways terminating in spaced relation to the curved front ends of said lower trackways, the rear portions of said return trackways being hinged and the free ends thereof normally resting by gravity on said lower trackways and means for imparting horizontal reciprocating motion to said feeding bar to move said bar through a predetermined cycle of motion constituting the movement of said feed bar rearwardly on said lower trackways to a point beyond the free ends of said hinged portions, then forwardly up said hinged portions and past the front ends of said return trackways, so as to cause said bar to drop by gravity to said lower trackways in order to repeat the aforesaid cycle of movements.

3. A device of the class described comprising a feeding bar adapted to extend across the front of an oven, a lower trackway for supporting each end of said bar at a height to engage bread pans, a return trackway in spaced relation above each of said lower trackways, the rear portions of said return trackways being hinged and the free ends thereof normally resting by gravity on said lower trackways, a sprocket chain journalled at each end of said feed bar, arms connecting said chains with the adjacent ends of said feed bar and means for driving said chains to move said feed bar rearwardly on said lower trackways to a point beyond the free ends of said hinged portions then forwardly up said hinged portions and past the front ends of said return trackways so as to cause said bar to drop by gravity on to said lower trackways to repeat the aforesaid cycle of movements.

In testimony whereof we have hereunto set our hands at Grand Rapids, Michigan this 29th day of August, 1928.

ARTHUR W. BRANDEEN.
LESLIE H. DION.